United States Patent Office 3,322,943
Patented May 30, 1967

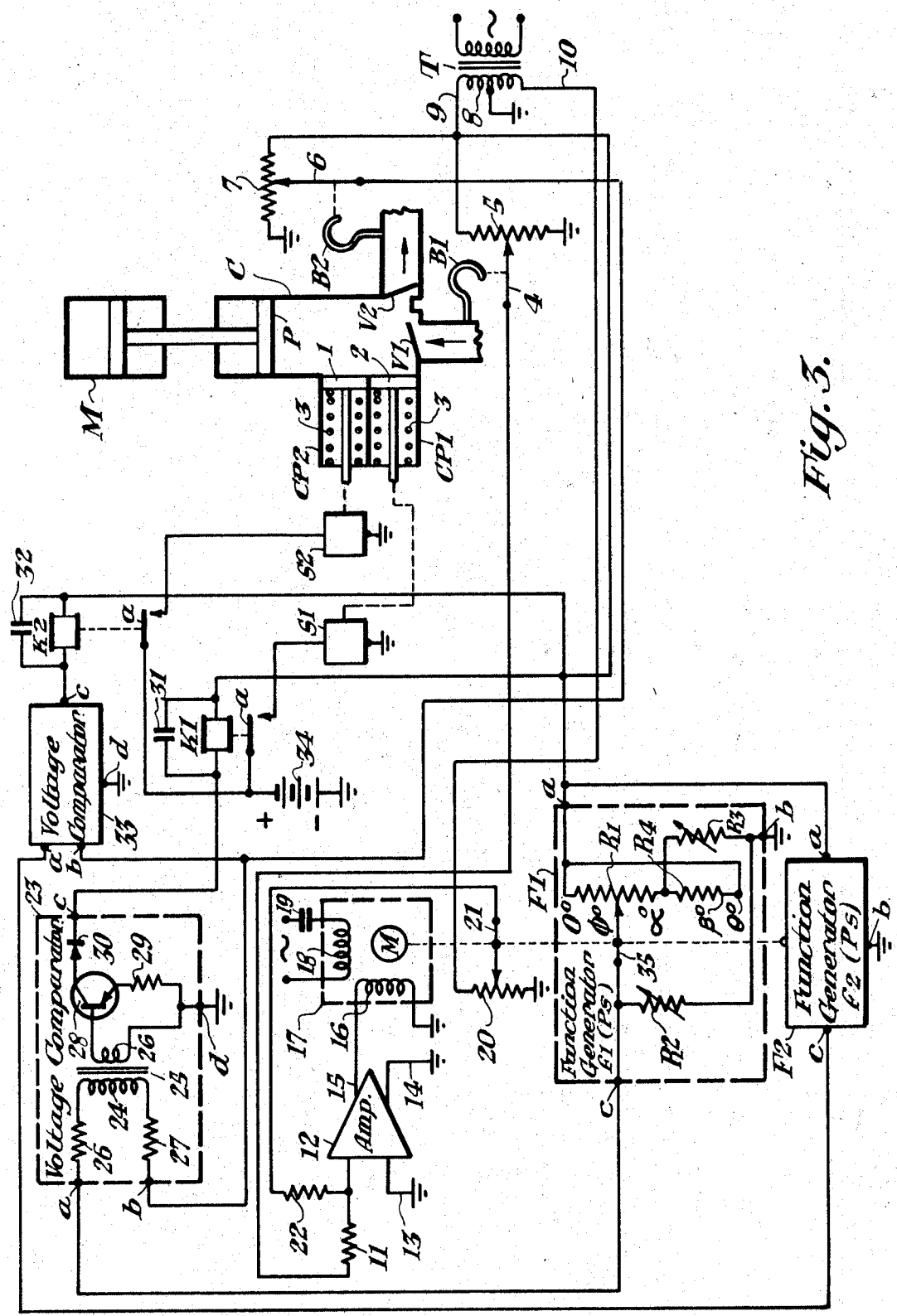

3,322,943
NON-LINEAR FUNCTION GENERATOR WHICH UTILIZES A POTENTIOMETER CONNECTED IN CIRCUIT WITH LOAD RESISTANCES
Robert R. Hartley, Niantic, Conn., assignor to Westinghouse Air Brake Company, Swissvale, Pa., a corporation of Pennsylvania
Original application May 13, 1960, Ser. No. 28,870, now Patent No. 3,088,656, dated May 7, 1963. Divided and this application Dec. 27, 1962, Ser. No. 247,603
2 Claims. (Cl. 235—197)

My invention relates to automatic control systems, and particularly to an improved non-linear function generator for use in such a system.

This application is a division of my copending application Ser. No. 28,870, filed May 13, 1960, now Patent No. 3,088,656 and entitled Compressor Load Control System. This earlier filed application is also assigned to the assignee of the present application.

In the operation of gas pipe lines, it is necessary to provide pumping stations at intervals along the lines to restore the pressure of the gas to desired transmission values. The tendency at the present time is to make the operation of such intermediate pumping stations as nearly automatic as is possible. To this end, it has been proposed to control the gas pumps or compressors at such stations to maintain the discharge pressure in the line leaving the station at a desired value. It is usual to drive such compressors from a constant speed motor. However, the compressors are often required to compress varying amounts of gas at varying suction and discharge pressures. Under these conditions, the torque, and hence the brake horsepower demand, of a compressor varies greatly. In order to keep the required torque within the limits of the compressor, several methods of unloading have been used, such load controls as suction valve unloaders and clearance pockets being commonly used. At present these controls are manually actuated by an operator. Thus, in a manned station having compressors provided with clearance pockets in one or more cylinders, the operator can prevent damage from overloading, and also attain high efficiency, by opening or closing the clearance pockets to maintain the load in a desired range.

In United States Patent No. 3,024,964, granted on Mar. 13, 1962 to David G. Emmel for Automatic Torque Control for Reciprocating Compressor, and assigned to the assignee of the present application, means are disclosed for evaluating the brake horsepower demand of a compressor by comparing the condition of contacts on a group of relays actuated in a combination dependent on the suction pressure of the compressor with contacts on relays actuated in a combination dependent on the discharge pressure, whereby the necessary pockets can be opened when predetermined relations exist between the suction pressure and the discharge pressure. This method, which approximates the demand of the compressor in stepwise fashion, is satisfactory in many instances, but is obviously limited in accuracy by the number of relays employed, so that a relatively large number of relays would be needed to attain high precision of control.

My above mentioned application Ser. No. 28,870, of which this application is a division, relates to an improved system for controlling the clearance pockets, or other unloading devices, of a compressor, employing relatively simple and inexpensive apparatus acting in accordance with a continuous function of the operating variables. The function generator of the present invention was developed for and finds particular utility in use in such a compressor control system, although the use of the function generator is not limited to such systems.

It is accordingly an object of the present invention to provide an improved nonlinear function generator.

A further object of my invention is to provide means for generating a signal in accordance with a function of the operating variables of a compressor indicative of the brake horsepower demand of the compressor.

A further object of my invention is to provide an improved function generator having a transfer function which is readily adjusted to fit a wide variety of functional transformations.

A further object of my invention is to provide electrical means for defining an area of operation of a physical system, and apparatus for detecting operation within the defined area to exert a control on the system corresponding to the area of operation.

Other objects and further advantages of my invention will become apparent to those skilled in the art as the description proceeds.

Briefly stated, and in accordance with one embodiment of my present invention, I provide a potentiometer and a servomechanism for adjusting the potentiometer. The servomechanism is linearly positioned in response to the variable for which it is desired to generate a non-linear function. Load resistances are connected to the potentiometer to adjust its output in accordance with a predetermined non-linear function of the variable controlling the servomechanism.

I shall first describe one embodiment of my invention in detail, and shall then point out the novel features thereof in claims.

In the drawings, FIG. 1 is a graph showing an operating curve superimposed on typical brake horsepower demand curves for a gas compressor.

FIG. 3 is a schematic wiring diagram including one embodiment of my invention.

Figure 1:
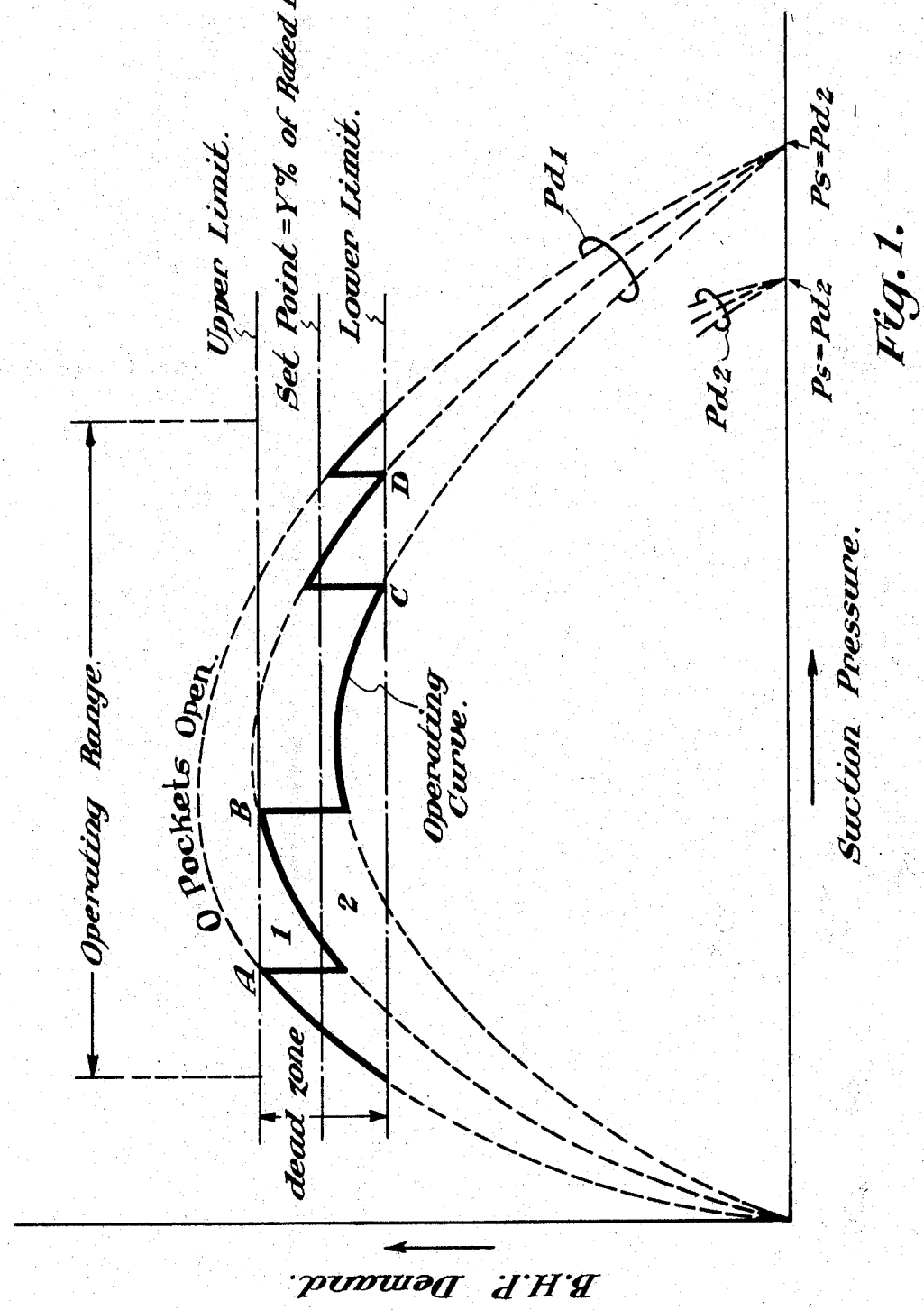

Referring first to FIG. 1 typical demand curves for a compressor are shown. It will be seen that at any given discharge pressure such as $P_{d1}$ a family of curves is generated, each curve starting at the original and returning to zero demand at a suction pressure equal to the discharge pressure. As indicated, the upper curve shown corresponds to operation with no clearance pockets open, the second curve corresponds to operation with one clearance pocket open, and the lower curve corresponds to operation with two pockets open. The reason that the curves fall in the upper range of suction pressure is that, since the suction pressure and the discharge pressure are close together, little work is done on the gas. The reason that the curves fall in the lower range of suction pressure, in spite of the higher compression ratio, is that little gas is moved by the compressor at low suction pressures. As also indicated on the drawings, at any other discharge pressure $P_{d2}$, a different family of curves would be generated. It should be understood that, while the following discussion will be limited for simplicity to a compressor provided with clearance pockets, any other suitable unloading device can be employed to perform the function of controlling the load on the compressor, if so desired, without departing from the scope of my invention.

It is generally desired to operate a compressor at a relatively constant high percentage Y of its rated load, corresponding to the set point shown in FIG. 1. In fact, it may be desirable to make the set point at 100 percent of rated load, since normally some excursions above this value can be tolerated. However, associated with the set point are upper limits and lower limits which it is undesirable to exceed in operation.

If the compressor is to be operated over a range of the extent indicated by the solid line in FIG. 1, it is apparent that at the lower values of suction pressure, the compressor may be operated with no pockets open. However, should the suction pressure rise to point A in FIG. 1, it will be necessary to open a pocket to reduce the demand to the next lower curve to prevent the upper limit from being exceeded. Operation can then continue with one pocket open until the suction pressure increases to point B in FIG. 1, at which time the second pocket must be opened to further reduce the demand. Operation can continue with two pockets open until the suction pressure reaches point C on the lower curve, at which time the second pocket must be closed in order to prevent the demand from falling below the established lower limit. It will be seen by similar reasoning that the first pocket must be closed, if the suction pressure reaches a value corresponding to point D in FIG. 1. While the example given shows a compressor having two operable clearance pockets, it will be apparent that the principles involved are equally applicable to a compressor having any number of clearance pockets.

Figure 2:
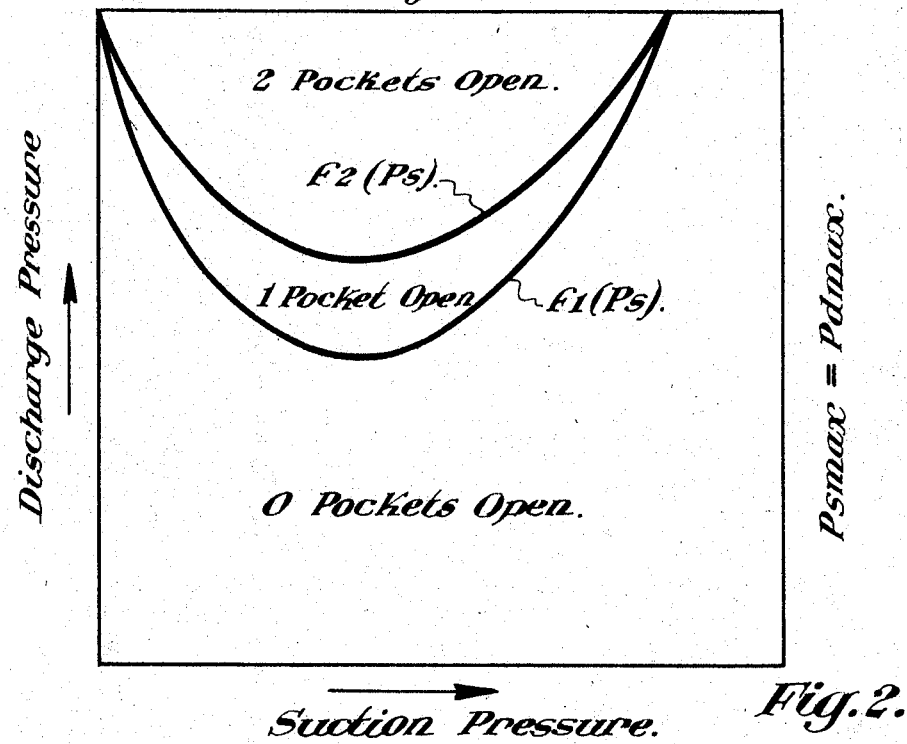
FIG. 2 is a graph showing typical functions of suction pressure which define regions in which various pockets on a compressor having operating curves of the type shown in FIG. 1 should be opened.

Referring now to FIG. 2, a graph of suction pressure versus discharge pressure incorporating the conditions under which the pockets indicated in FIG. 1 are open is shown. FIG. 2 is in effect a state diagram, in which the state of the pockets is defined in terms of regions of suction and discharge pressures, and in which the curves $f_1(P_s)$ and $f_2(P_s)$ define the boundaries between the states. That is, in the region above the upper curve, two pockets should be open, to secure proper operation; in the range between the curves, one pocket should be open; and below or beyond the lower curve, all of the pockets should be closed. The size of the regions between curves is essentially determined by the width of the dead zone shown in FIG. 1; in particular, if it were desired to reduce this dead zone, larger numbers of smaller pockets would have to be employed and there would accordingly be a larger number of curves in a plot of the type shown in FIG. 2. As will appear, the basic operation of the apparatus illustrated comprises comparing the discharge pressure with functions of suction pressure of the type shown in FIG. 2, and actuating pockets in accordance with the state of the system as determined by the comparison.

Referring now to FIG. 3, a schematic wiring diagram of apparatus for controlling a compressor C driven by a constant speed reciprocating motor M is shown. Motor M and compressor C are shown schematically, it being understood that any conventional structure could be employed. It is sufficient to note that the illustrated compressor operates as a typical force pump having an inlet valve V1 and an outlet valve V2 which are automatically operative in response to the pressure variations introduced by the reciprocation of the piston P.

In addition to the basic structure of the compressor conventionally shown, the addition of clearance pockets CP1 and CP2, also conventional, is shown schematically. It should be understood, however, that the two pockets would commonly be in different cylinders of the compressor, they having been shown in the same cylinder merely to simplify the drawings. As is obvious from the drawing, these clearance pockets comprise spaces in the cylinder head which are adapted to be closed by pistons 1 and 2 under the influence of means here shown as biasing springs 3. When the pockets are closed, the compression ratio of compressor C is a maximum. When pocket CP1 is opened by the movement of piston 2 under the influence of means schematically indicated as a solenoid S1, the compression ratio has an intermediate value. When clearance pocket CP2 is operated under the control of a solenoid S2, pocket CP1 also being open at this time, the compression ratio is at a minimum value. It will be understood by those skilled in the art that these clearance pockets and the controls therefor may be of any desired conventional construction, and that the details of the control are not illustrated because they form no part of my present invention. In particular, the connection schematically indicated by the dotted line between the solenoids S1 and S2 and their respective clearance pocket pistons would normally be of an irreversible type incorporating force amplifications; for example, conventionally this connection might incorporate a pneumatic or hydraulic servomechanism connected to the piston, possibly through irreversible gearing, and actuated by the solenoids in a conventional manner.

In addition to the clearance pockets and the controls therefor, compressor C is additionally provided with pressure responsive means here shown as Bourdon tubes B1 and B2 in the supply and discharge lines, respectively, for sensing the supply and discharge pressures. The supply pressure, commonly called the suction pressure $P_s$, is sensed by Bourdon tube B1 and converted to an electrical signal in any conventional manner, as by adjustment of the wiper 4 of a potentiometer 5 by a connection between the Bourdon tube and wiper 4 schematically indicated by a dotted line. In similar manner, Bourdon tube B2 is operatively connected to the wiper 6 of a potentiometer 7 to provide an electrical signal in accordance with the discharge pressure $P_d$.

Potentiometers 5 and 7 are energized by conventional means here shown as a transformer T having a primary winding energized by any conventional source of alternating current, which for example might be a 110 volt, 60 cycle source. The secondary winding 8 of transformer T is center-tapped as shown, and thus provides a first reference voltage at its upper terminal 9 which is of a given phase, and a second equal reference voltage at its lower terminal 10 which is of the opposite phase. As shown, upper terminal 9 of secondary winding 8 is connected in parallel across the resistive elements of potentiometers 5 and 7. Since potentiometer 5 is adjusted in accordance with the suction pressure $P_s$, a signal will accordingly appear on wiper 4 which is proportional to $P_s$, and, similarly, a signal proportional to $P_d$ will appear on wiper 6 of potentiometer 7.

Wiper 4 of potentiometer 5 is connected through a summing resistor 11 to the input terminal of a conventional phase discriminating servo amplifier 12. The input and output amplifier 12 are grounded at 13 and 14, respectively, as shown. Output terminal 15 of amplifier 12 is connected to one side of one winding 16 of a conventional split phase servomotor 17, the other terminal of winding 16 being grounded as shown. The second winding 18 of motor 17 is connected through a conventional phase shifting capacitor 19 to the terminals of an alternating source of the same frequency as that supplying transformer T.

Amplifier 12 and motor 17 cooperate in a conventional manner, the output of the amplifier driving the motor in one direction or the other depending on the phase of the input to the amplifier compared to the phase of the supply. Positional feedback to amplifier 12 from motor 17 is supplied in a conventional manner as shown by a followup potentiometer 20 energized from terminal 10 of transformer T and having a wiper 21 adjusted by motor 17 and connected through a summing resistor 22 to the input of amplifier 12. Since the inputs through summing resistors 11 and 22 are of opposite phase, application of a signal to the amplifier from potentiometer 5 will result in operation of the motor until the signal from followup potentiometer 20 balances out the input, which will occur at a position of the motor and of the wiper 21 on potentiometer 20 corresponding to the value of suction pressure $P_s$.

As schematically indicated, the rotor of motor 17 is also drivably connected to potentiometer wipers in two function generators F1 and F2 constructed in accordance with the present invention. The theory underlying the operation of these function generators will be described in more detail below. For present purposes it is sufficient to point out that both of the function generators are energized from the upper terminal 9 of secondary winding 8 of transformer T, by connection to input terminals which I have designed as $a$, the return circuit being completed by connection to grounded terminals $b$ of the function generators. (It will be understood that these terminals may not necessarily have any physical counterparts, since they are merely adopted for reference convenience.) Both function generators operate in a manner to be described to produce signals at their output terminals $c$ which are functions of the suction pressure $P_s$. In particular, function generator F1 produces an output $f_1(P_s)$ which exceeds the discharge pressure when no pockets are open and the load is within the limits set by the established dead zone. In other words, referring to FIG. 2, when the value of discharge pressure exceeds $f_1(P_s)$, the first pocket CP1 should be opened to prevent the design load limit from being exceeded. Function generator F2 produces an output in accordance with $f_2(P_s)$, and, as shown in FIG. 2, when the discharge pressure exceeds the value given by this function, the second pocket CP2 should be opened. It will be understood that in the illustrated embodiment pocket CP1 is opened first, and is open at all times that the discharge pressure exceeds $f_1(P_s)$, so that in the region where the discharge pressure exceeds $f_2(P_s)$ both pockets are open. This analysis is obviously capable of extension to any number of pockets.

The output at terminal $c$ of function generator F1 is applied to input terminal $a$ of a voltage comparator 23. A second input to the voltage comparator is applied to its input terminal $b$ from wiper 6 of potentiometer 7; it will be recalled that a voltage proportional to $P_d$ is present in this wiper.

Terminals $a$ and $b$ of the voltage comparator 23 are connected together through the primary winding 24 of a transformer 25 and, if desired, through one or more series resistances such as 26 and 27 which reduce the loading on function generator F1. Since the output of function generator F1 and that of potentiometer 7 are of the same phase, when the voltages at terminals $a$ and $b$ of comparator 23 are equal in amplitude, there will be no output voltage across secondary 26 of transformer 25. However, if the voltage at terminal $a$ exceeds the voltage at terminal $b$, an output voltage of a first phase will appear across secondary winding 26. Similarly, if the voltage at terminal $b$ exceeds that at terminal $a$, a voltage of opposite phase will appear across secondary winding 26. As shown, secondary winding 26 is connected between the base of a transistor 28 and ground at terminal $d$ of comparator 23. The emitter of transistor 28 is connected to ground through a biasing resistor 29. Transistor 28 is here shown as a conventional p-n-p type, though it is obvious that any other type could be employed by suitable necessary changes in the circuit. The collector of transistor 28 is connected through a diode 30 to output terminal $c$ of voltage comparator 23. As is known in the art, the conventional bias for transistor 28 is in the forward direction for the emitter and in the reverse direction for the collector, both with respect to the base. It will be seen that the emitter of transistor 28 will be alternately forward biased and reverse biased in succeeding half cycles of any voltage appearing across secondary 26 of transformer 25. No collector current will flow during the half cycles during which the emitter is back biased. Whether an appreciable collector current will flow during the half cycle that the emitter is forward biased will depend on the voltage applied to terminal $c$ of the voltage comparator.

As shown, terminal $c$ of the voltage comparator is energized by a circuit extending from terminal 9 of transformer T through the winding of relay K1 in parallel with a suitable filter capacitor 31. Thus, terminal $c$ is alternately positive and negative in phase with terminal 9. When terminal $c$ is positive, diode 30 blocks the path from terminal $c$ to ground, and damaging forward bias on the collector of transistor 28 is prevented. At this time, no current flows through the winding of relay K1. On negative half cycles of terminal 9, the collector of transistor 28 is reverse biased, and if the emitter is forward biased at this time, current will flow from ground terminal $d$ through resistor 29, into the emitter of transistor 28 and out the collector, through diode 30, through the winding of relay K1, and back to ground through the upper half of secondary winding 8 of transformer T. Accordingly, relay K1 will be energized and will open its contact $a$ as shown. It will be apparent that whether or not the emitter is forward biased at this time depends on whether the voltage at input terminal $a$ of comparator 23 exceeds the voltage on input terminal $b$. Transformer 25 is so wound that when the voltage on input terminal $a$ exceeds the voltage on input terminal $b$, the emitter will be forward biased during negative half cycles of terminal 9 of transformer T, so that relay K1 will be energized when the output of function generator F1 exceeds the discharge pressure signal from potentiometer 7. However, when the discharge pressure exceeds $f_1(P_s)$, and the voltage on terminal $b$ of comparator 23 therefore exceeds the voltage on terminal $a$, the emitter of transistor 28 will be back-biased when the collector is biased, so that no current will flow through the transistor and relay K1 will become deenergized and close its contact $a$.

The output of function generator F2 is compared with the signal from potentiometer 7 in a manner analogous to that just described in a second voltage comparator 33, which may be similar in all respects to voltage comparator 23, described above. Output terminal $c$ of comparator 33 is also energized from output terminal 9 of transformer T through the winding of a relay and a capacitor in parallel, in this case relay K2 and a suitable filter capacitor 32. Accordingly, when the discharge pressure exceeds $f_2(P_s)$, relay K2 will be deenergized and will close its contact $a$.

As shown, pocket control solenoids S1 and S2 are energized by parallel circuits which extend from the positive terminal of a suitable source of potential such as a battery 34, which has its other terminal grounded as shown, over back contacts $a$ of relays K1 and K2, respectively, and through the windings of the respective solenoids to ground.

The operation of the novel function generators F1 and F2 shown in FIG. 3 will next be described. For this purpose, only function generator F1 will be described, since function generator F2 operates in the same manner and differs only in the value of the individual resistors, in a manner which will be pointed out below.

As shown in FIG. 3, function generator F1 basically comprises a potentiometer which includes a wiper 35 rotating over a path which includes resistors R1 and R4 in series and a segment of essentially no resistance for a portion of the travel past R4. These areas are indicated on the drawings, beginning with the top of resistor R1 which is designated as zero degrees (0°) and which corresponse to zero (0) suction pressure, and terminating with $\theta$ degrees, corresponding to the maximum suction pressure, which is also equal to the maximum discharge pressure to be encountered. Intermediate the zero degrees (0°) and $\theta$ degrees position is a first position $\phi$, corresponding to the instantaneous position of the wiper, and which may range from 0 to $\theta$, a position $\alpha$ which corresponds to the junction of the resistive portions R1 and R4, and a position at $\beta$ degrees which corresponds to the end of the resistance portion R4. As shown, the ends of the potentiometer are connected together and are also connecter to output terminal 9 of transformer T. Variable resistance R3 has one end connected to the junction of R1 and R4, and its opposite end grounded as shown. A variable resistance R2 is connected between the wiper 35 of the potentiometer and ground. It can be shown that the ratio of the voltage $e_i$ applied between input terminal $a$ of function generator F1 and ground terminal $b$ to the output voltage $e_o$ appearing between output terminal $c$ and ground terminal $b$ is given by the equation:

$$\frac{e_o}{e_i} = \frac{1 - \frac{XR_4}{R_3 + \frac{R_4(R_1+R_3)}{R_1}}}{1 + \frac{(X-X^2)R_1}{R_2} + \frac{X^2R_4}{R_2 + R_2R_4\left(\frac{R_1+R_3}{R_1R_3}\right)}}$$

Where $$X = \phi/\alpha, \quad 0 \leq \phi \leq \alpha$$

And $$\frac{e_o}{e_i} = \frac{1 - \frac{XR_1}{R_3 + \frac{R_1}{R_4}(R_4+R_3)}}{1 + \frac{(X-X^2)R_4}{R_2} + \frac{X^2R_1}{R_2 + R_2R_1\left(\frac{R_4+R_3}{R_4R_3}\right)}}$$

Where $$X = \frac{\phi - \alpha}{\beta - \alpha}, \quad \alpha \leq \phi \leq \beta$$

And $$\frac{e_o}{e_i} = 1, \quad \beta \leq \phi \leq \theta$$

Figure 4:
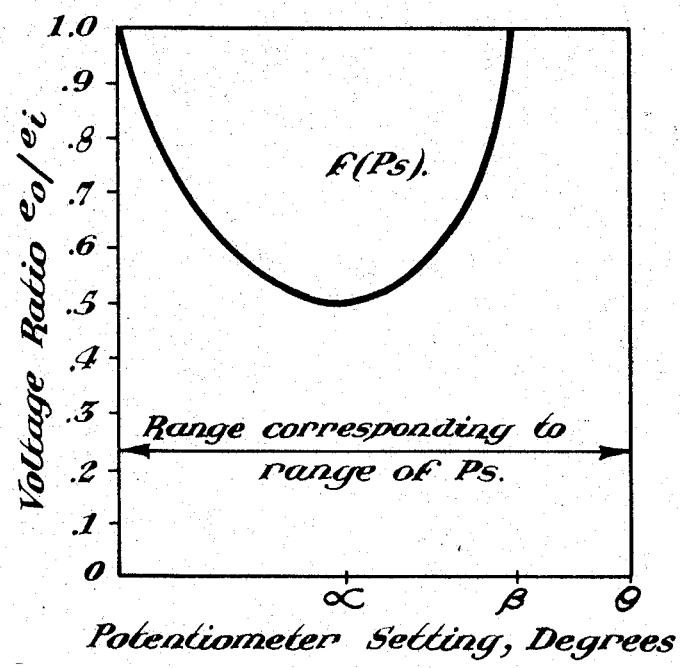
FIG. 4 is a graph showing the transfer characteristics of a function generator according to the present invention employed in the apparatus of FIG. 3.

This output curve will conform in general to that shown in FIG. 4. In FIG. 4, the location of the various significant points on the potentiometer are indicated. As can be shown from the above equations, this curve, which has been designated generally as $f(P_s)$, can be made to conform to any of a very wide class of functions by a proper choice of the resistances R1, R2, R3 and R4. In particular, assuming that the curve of FIG. 4 corresponds to the case in which all of the resistances are equal, making resistances R2 and R3 larger with respect to resistances R1 and R4 will raise the minimum, which occurs at $\alpha$ degrees, and, conversely, lowering the values of resistances R2 and R3 with respect to R1 and R4 will lower the minimum. In addition, the minimum can be displaced to the right by making resistance R1 large with respect to R4. Changing resistance R3 alone will raise or lower the minimum according as the resistance is increased or decreased, and the same is true of R2 except that it has the effect of making the resultant curve steeper. Accordingly, it will be apparent that the functions $f_1(P_s)$ and $f_2(P_s)$ in FIG. 2 can be very closely approximated by the proper choice of resistors in function generators F1 and F2 in accordance with the desired operating curve of a particular compressor and the equations given above. For example, in one practical embodiment of my invention, for function generator F1 resistance R2 was nominally set to 10.5K, resistance R3 was nominally set to 8.3K, the potentiometer had a total resistance R1 plus R4 of 20K, the value of $\alpha$ was 112 degrees, the value of $\beta$ was 224 degrees, and the value of $\theta$ was 320 degrees. For F2, resistance R2 was set to 13.3K, R3 was set to 10K, $\alpha$ was 120 degrees, and the other constants were the same as for F1. It will be apparent that these settings can readily be varied in practice to suit a particular installation and to correct for wear or other changes occurring after installation.

The operation of the apparatus in FIG. 3 will be illustrated with respect to the typical operating curve of FIG. 1.

It will first be assumed that motor M is running at a constant speed, that pockets CP1 and CP2 are closed, and that the rest of the apparatus is in the condition shown. Referring to FIG. 1, it will be assumed that the suction pressure gradually rises from the beginning to the end of the indicated operating range. It will also be assumed that the discharge pressure is floating, as determined by the operation of the compressor, since any external controls are irrelevant to an understanding of the present invention. Accordingly, potentiometer 5 will be continuously adjusted to reflect the increase in suction pressure, and potentiometer 7 will fluctuate in accordance with the conditions imposed by the compressor and the discharge line.

Servomotor 17 will follow the operation of potentiometer 5 to adjust function generators F1 and F2 in accordance with the suction pressure so that the output of the function generators will be in the form shown in FIG. 4, and specifically conforming to the functions shown in FIG. 2. As the brake horsepower demand rises along the curve shown in FIG. 1 up to a point A on the curve, the discharge pressure will always be less than $f_1(P_s)$, so that the conditions of voltage comparators 23 and 33 will cause energization of relays K1 and K2. Accordingly, solenoids S1 and S2 will be released and pockets CP1 and CP2 will be closed as shown. As the brake horsepower demand reaches point A, the discharge pressure will exceed $f_1(P_s)$ and voltage comparator 23 will respond to deenergize relay K1 and consequently energize solenoid S1. Pocket CP1 will then be open and operation of the system will occur without further change along the second curve in FIG. 1 until point B is reached. At this time, $P_d$ will exceed $f_2(P_s)$, and voltage comparator 33 will respond to deenergize relay K2 and energize solenoid S2. Pocket CP2 will then be opened, and operation will take place along the lower curve of FIG. 1 with both pockets open until point C is reached. At this time, $P_d$ will fall below $f_2(P_s)$, and comparator 33 will respond to cause relay K2 to be energized, thereby releasing solenoid S2 and allowing pocket CP2 to close. Operation will then continue along the second curve of FIG. 1 with one pocket open until point D is reached, at which time $P_d$ will fall below $f_1(P_s)$. Comparator 23 will respond to cause relay K1 to be energized, which will release solenoid S1 and allow pocket CP1 to close. Operation of the compressor will then continue along the upper curve in FIG. 1, which will be followed as far as the operating range will permit. Should the suction pressure fall, a reverse operation will be experienced.

While I have shown a preferred embodiment of my invention in detail, it should be understood that this embodiment is merely illustrative of the form which my invention may take, and many modifications will be apparent to those skilled in the art. Accordingly, I do not wish to be limited by the details shown, but only by the scope of the following claims.

Having thus described my invention, what I claim is:

1. A function generator for generating a function of a variable defined over a range and having a minimum value within said range, comprising, in combination, a potentiometer including a wiper adjustable on a resistance element, a tap point dividing said resistance element into portions having values related in accordance with the location of said minimum value in said range, source of voltage having first and second terminals, means for connecting said first terminal of said source of voltage to both ends of said resistance element, a first resistor having one end connected to said tap point, means for connecting the other end of said first resistor to said second terminal of said source, a second resistor connecting said wiper to said second terminal of said source and means for adjusting said wiper in accordance with said variable, whereby a voltage appears between said wiper and said second terminal which is proportional to said function in said range.

2. A non-linear resistance network, comprising, in combination, a potentiometer comprising a wiper and a resistance element on which said wiper is movable, said resistance element having a first portion of a first value, a second portion of a second value, and a third portion intermediate said first and second portion of negligible resistance, a first variable resistor having one end connected to said resistance element between said first and second portions, a voltage source having first and second terminals, a second variable resistor having one end connected to said wiper, the other ends of said variable resistors being connected together and mutually connected to said second terminal of said voltage source, and a conductive electrical connection between opposite ends of said resistance element, said conductive electrical connection electrically connected to said first terminal of said voltage source.

References Cited

UNITED STATES PATENTS

| | | | |
|---|---|---|---|
| 2,559,513 | 7/1951 | Palmer | 318—28 |
| 2,871,429 | 1/1959 | Fogiel | 318—29 |
| 2,897,426 | 7/1959 | Hotine | 235—197 X |

OTHER REFERENCES

Pp. 316–329, 1956, Korn, G. A. et al., Electronic Analog Computers, N.Y., McGraw-Hill.

Pp. 579–585, October 1958, Williams, R. W., et al., Resistance Potentiometers as Function Generators. In Electronic Engineering, vol. 30, No. 368.

Pp. 192–199, April 1959, Garner, K. C., Linear Multi-Tapped Potentiometers with Loaded Outputs. In Electronic Engineering, vol. 31, No. 374.

MALCOLM A. MORRISON, *Primary Examiner.*

I. KESCHNER, *Assistant Examiners.*